(No Model.) 2 Sheets—Sheet 1.

C. F. SCOTT & C. E. SKINNER.
DEVICE FOR DETECTING SHORT CIRCUITS.

No. 556,646. Patented Mar. 17, 1896.

WITNESSES:
George Brown Jr.

INVENTORS
C. F. Scott + C. E. Skinner
BY Terry & MacKaye
ATTORNEYS (No Model.) 2 Sheets—Sheet 2.

C. F. SCOTT & C. E. SKINNER.
DEVICE FOR DETECTING SHORT CIRCUITS.

No. 556,646. Patented Mar. 17, 1896.

WITNESSES:
George Brown
H. C. Tener

INVENTORS
C. F. Scott + C. E. Skinner
BY
Terry + MacKay
ATTORNEY.

UNITED STATES PATENT OFFICE.

CHARLES F. SCOTT, OF PITTSBURG, AND CHARLES E. SKINNER, OF ALLEGHENY, ASSIGNORS TO THE WESTINGHOUSE ELECTRIC AND MANUFACTURING COMPANY, OF PITTSBURG, PENNSYLVANIA.

DEVICE FOR DETECTING SHORT CIRCUITS.

SPECIFICATION forming part of Letters Patent No. 556,646, dated March 17, 1896.

Application filed December 31, 1892. Serial No. 456,955. (No model.)

*To all whom it may concern:*

Be it known that we, CHARLES F. SCOTT, residing in the city of Pittsburg, and CHARLES E. SKINNER, residing in the city of Allegheny, in the county of Allegheny and State of Pennsylvania, citizens of the United States, have invented a new and useful Improvement in Devices for Detecting Short Circuits, (Case No. 527,) of which the following is a specification.

Our invention has relation to means whereby armature-coils may be tested for short circuits.

One object of our invention is to provide a testing device whereby short circuits may be detected at any stage in the process of building an armature.

Another object of our invention is the provision of a testing device adapted to armatures of various designs.

Another object of our invention is the provision of a testing device adapted to indicate the condition of all the coils in an armature, either finished or partly so, in the shortest possible time.

With these ends in view we have devised the apparatus and method hereinafter described, and illustrated in the accompanying drawings, in which—

Figure 1:
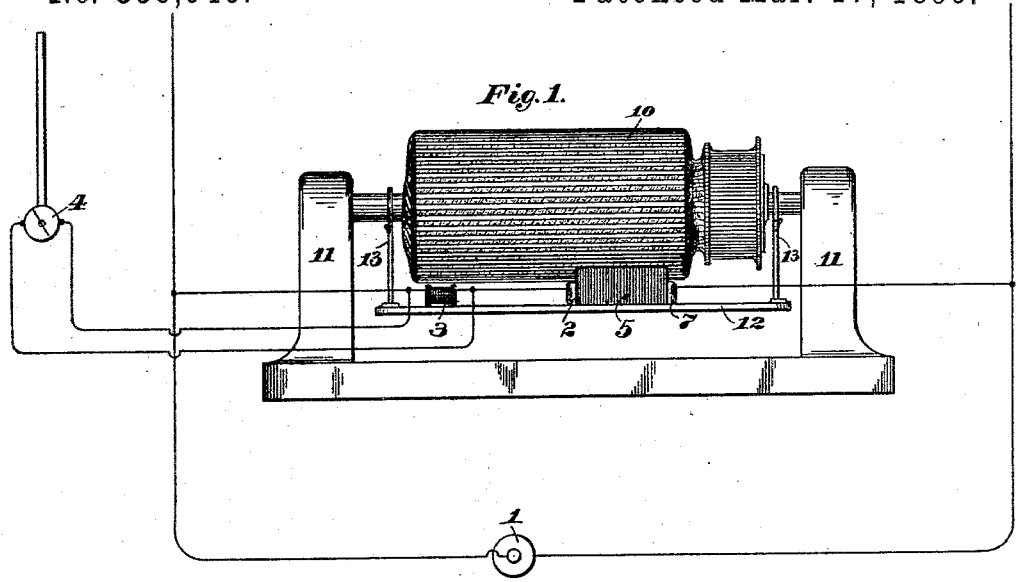
Figure 2:
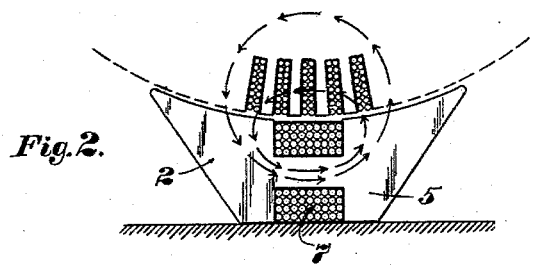
Figure 3:
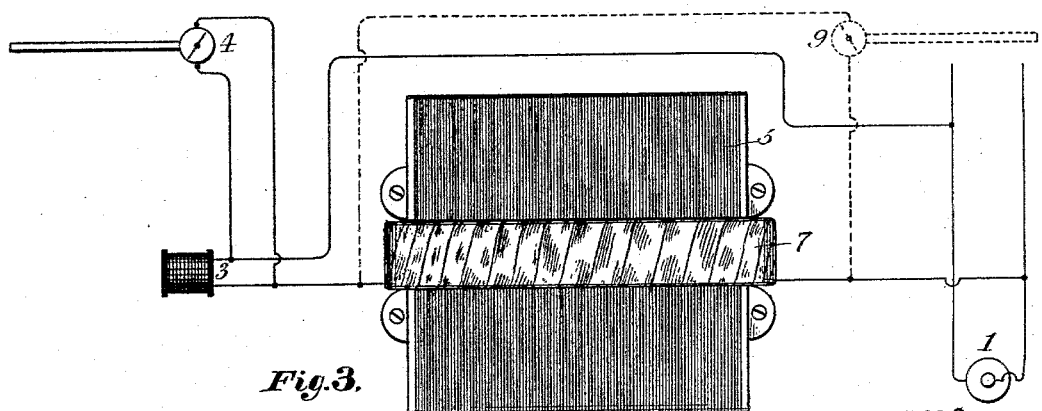
Figure 4:
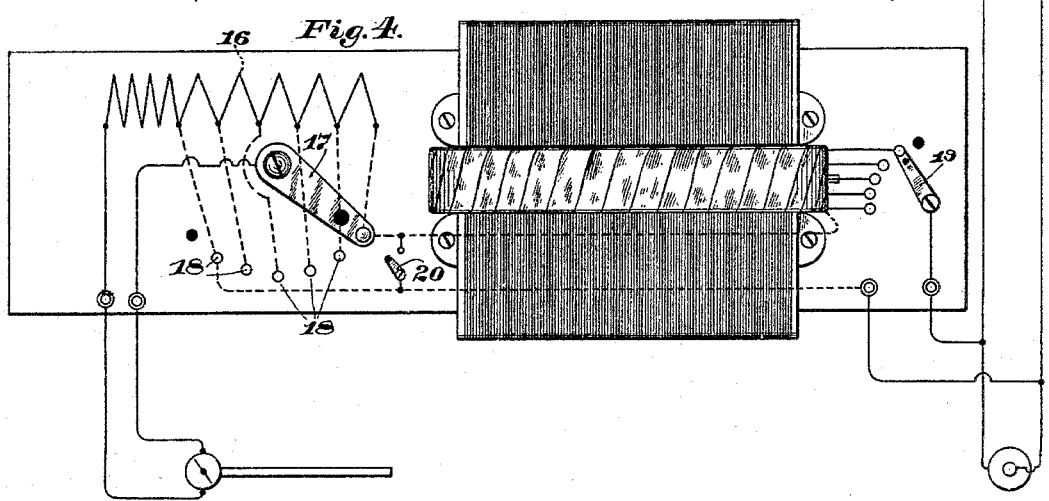
Figure 5:
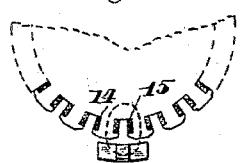
Figure 6:
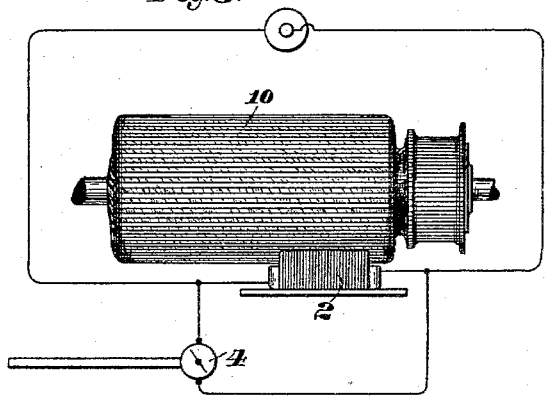
Figure 7:
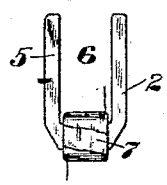
Figure 8:
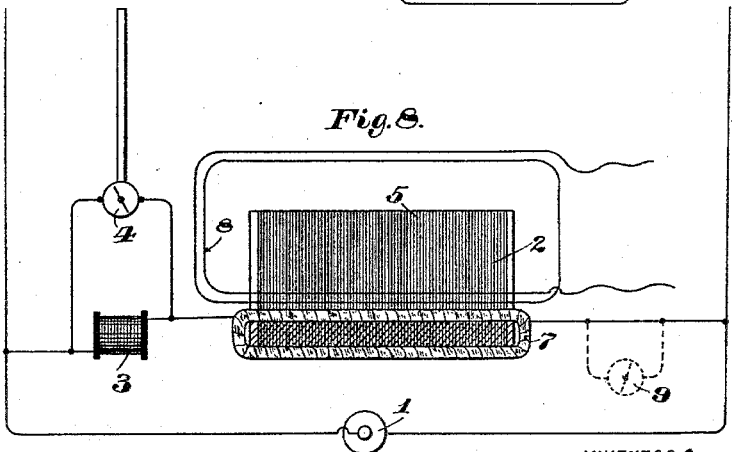

Figure 1 is a side view of an armature mounted in temporary bearings and showing the manner of hanging our device on the armature-shaft in the practice of our method of testing. Fig. 2 is a transverse section of the inductor, showing in section a portion of an armature in position so as to exhibit the magnetic circuit. Fig. 3 is a plan view of one form of our device, showing the manner of assembling parts upon the base. Fig. 4 is a diagrammatic view of a modified form of device adapted to the testing of various armatures. Fig. 5 is a view similar to Fig. 2, but showing another form of armature. Fig. 6 shows the assemblage of parts employed by us where only a constant-current circuit is available; and Figs. 7 and 8 show a transverse and a longitudinal vertical section, respectively, of a form of device employed by us in testing coils ready-wound before being put upon their armatures.

It is very desirable that some means be devised whereby armatures may be tested before going out of the factory to discover any latent faults, which, if taken in time, could be easily remedied, but if allowed to remain in a working-machine would be productive of serious loss of time and money.

A fault of most frequent occurrence in armatures is the short-circuiting of the whole or part of a coil or coils by defective insulation. This defect is one which defies ordinary observation, and has hitherto been discoverable only by the occurrence of the catastrophe naturally resulting from it in actual practice—to wit, the burning out of the defective coil. By our method and with our apparatus it is possible to find faults of this nature in an armature at any stage of its construction, and to locate them accurately and with the utmost rapidity. The means employed by us are simple and easily manipulated by persons of ordinary intelligence.

Our method depends upon the law that there is action and reaction between a magnetic field and a closed circuit. In applying this law to the detection of faults in a given coil, a primary circuit is made to thread lines of force through the coil to be tested, and the counter electromotive force of the primary is observed before and after such threading occurs. If this observation gives a higher result after than before such threading of the coil to be tested, it is evident that a secondary current has been set up in said coil. In normally-open circuit-coils this necessarily indicates the presence of a short circuit. Where closed-circuit coils are to be tested there must frequently be so large an aggregate resistance that the occurrence of a short circuit in one or two of them would present a path of such comparatively low resistance as to render our method as practicable in this case as in that of open-circuit coils. When a group of coils are so tested and one in the group is found to be defective, it can be selected from the rest by permitting it to become heated by the current induced in it by the method above set forth. Thus it will be seen that our method comprehends not only the observation of the counter electromotive force in a primary, but the production by induced currents of heat in the coil to be tested.

The apparatus by means of which our method may be practiced consists essentially of an inductor and a detector, and these two elements may take a variety of forms, depending upon the kind of armature to be tested and the kind of current, whether of constant quantity or constant potential, available.

As our method depends upon induction, a broken, undulatory or alternating current must be employed. If only a direct-current circuit is available, any well-known device whereby it may be rendered irregular, intermittent or undulatory may be used.

When it is desired to use our invention to test single coils ready-wound for application to an armature, the form of device shown in Figs. 7 and 8 may be employed.

In Fig. 8, 1 is a generator, here of constant potential, although the constant-current method hereinafter set forth is of course applicable. At 2 is shown the inductor, and the parts 3 and 4 make up the detector. The inductor 2 is composed of a horseshoe magnet, preferably laminated, as shown at 5. This magnet has a deep space 6 between its arms and is wound with a magnetizing-coil 7.

The coil to be tested is shown at 8. This coil is introduced between the arms of the horseshoe 5, and the counter electromotive force in the coil 7 is observed before and after introduction of the coil, as above related.

Several methods of observation may be employed. When a constant-potential circuit is used, one form of detector consists of a resistance 3 in series with the coil 7 and an alternating-current voltmeter—for instance, Cardew's—in shunt around said resistance. It is evident that any change in the counter electromotive force of the coil 7 will cause a disturbance in the drop of potential at the terminals of the resistance 3, for the total potential across the two coils is constant, and if one potential drop increases the other must decrease. Thus if the potential across the coil 3, as shown by the voltmeter, rises it is evident that the counter electromotive force of 7 must have fallen, and if this occurs upon introduction of the coil 8 into the field of the magnet 5 there must be a secondary circuit in said coil due to short circuit.

Another method of observation practicable with a constant-potential circuit would be the use of an ammeter in the branch employed, as indicated by dotted lines at 9 in Fig. 8. In this case the ammeter 9 is a complete detector, and the parts 3 and 4 are omitted. An increase of current would be observed on introducing a defective coil. Another form of detector for constant-potential circuits will be described in connection with Fig. 4.

Where it is desired to test an armature, either completed or with its coils merely in place and unbound, or at any other stage of preparation, the apparatus illustrated in Fig. 1 is preferably employed. The armature 10 to be tested is mounted on temporary bearings 11, wherein it may revolve. A base 12 is then hung by arms 13 to the shaft of the armature, so as to freely swing thereon and to maintain a vertical position as the armature revolves. Upon this base is mounted the inductor at 2, having poles 5 and a coil 7, as in Fig. 8; also mounted on said base is placed the resistance 3 in series with the coil 7, and in any convenient position a voltmeter 4 is placed in shunt around 3. Now by simply revolving the armature in the bearings 11 the coils are successively brought into the field of force of the inductor 2, and if one of them is defective at any point a current will be set up in it and the voltmeter will "kick," thus detecting the short circuit.

The shape of the inductor preferably used in the arrangement shown in Fig. 1 is shown in Fig. 2, as well as the relation of the armature-coils to the field of force represented by the arrows.

The form of armature shown in Figs. 1 and 2 is that patented to B. G. Lamme, dated December 13, 1892, No. 488,016, wherein ready-made coils are inserted between the teeth of the drum, each spanning a considerable number of teeth and in practice including ninety degrees of an arc. As shown in Fig. 2, one side only of five different coils are shown in section on the armature, and the lines of force indicated by the arrows will thread through all five at once in the same direction. When a kick of the voltmeter is thus observed, the armature is slowly turned until a maximum reading of the voltmeter occurs, when the armature is maintained stationary for a few seconds. This will quickly result in a heating of the particular coil short-circuited, which may then be removed for repairs. A plan view of this form of testing device exhibiting the laminations of the inductor is shown in Fig. 3, where is also indicated in dotted lines a Cardew voltmeter in shunt around the inductor itself. It is evident that a voltmeter in such a position, where the inductor was not the only cause of potential drop on its own branch, would serve to show any change proportionally in the potential drop at the terminals of the inductor, and so act as a detector.

In Fig. 5 is shown our invention as used in connection with another form of armature. This form has projecting teeth, around each of which is wound a coil. The dotted line in the figure shows the field of force in position to detect faults in the two coils 14 and 15. If the voltmeter gives a higher reading in this position than in a similar position with relation to the other teeth of the armature one of the two coils must provide a closed circuit, and by the heating test it can be determined which of the two is so defective.

In Fig. 4 is shown still another arrangement for constant-potential circuits. In this form the detector consists of a converter, preferably, as shown, an autoconverter 16, having its primary in series with the inductor, and a voltmeter in the secondary circuit. The switch 17, making contact with points 18, connected at intermediate points to the primary coils of the converter 16, enables the operator to vary the effect of the testing-current on the voltmeter to suit various types of coils, while a further variation is made possible by the switch 19, whereby more or less inductor-coils are thrown into circuit. When by this arrangement a kick of the voltmeter betrays the fact that a defective coil is in the field of force of the inductor, the switch 20 may be closed, and the whole current may be confined to the inductor-coil. This greatly increases the amount of current caused to circulate through the defective coil, which is thus the more speedily detected. This device of throwing the whole current upon the inductor-coil may be employed in any of the arrangements herein shown for accelerating the heating effect.

In Fig. 6 is shown the simplest form of detector. This is simply a voltmeter in shunt around the inductor. The armature is at 10 and the inductor at 2. The detecting-voltmeter is at 4. This arrangement can, of course, only be employed in a constant-current circuit. The presence of a secondary circuit will lower the indication of the voltmeter, as a less potential will be required to drive the constant current through the coil.

As the essential elements of our invention are no more than an inductor and a detector, it may be necessary to state that in our claims the word "inductor" means any device whereby a magnetic impulse may be produced in a coil to be tested whether including a paramagnetic core or not. Moreover, it is not necessary that more than one magnetic impulse be produced at a time in order that the device producing it may answer to what we mean in our claims by an inductor. Moreover, while the apparatus herein described depends upon the observation of the counter electromotive force in a magnetizing-coil the process invented by us is of broader scope, comprehending the simple step of observing the effect of the coil to be tested upon magnetic lines of force, and vice versa.

Ours is broadly a method of determining whether or not a closed electric circuit is present in a given coil or coils. If there is such a circuit present, the coil will react upon a magnetic field; if not, it will have no effect upon such a field. On the other hand, if such a circuit is present the magnetic field will itself act upon the coil, producing a current which may be made sufficient to heat the coil and so betray the short circuit. Any method of determining whether such an interaction of magnetic field and coil exists will then fall within our invention.

Having thus set forth the nature of our invention, what we claim is—

1. The method of detecting whether or not a closed circuit is present in a given coil which consists in varying the number of lines of force passing through said coil and determining whether or not said coil is heated thereby.

2. The method of detecting defective coils in an open-coil armature, which consists in revolving the armature in front of an electromagnet of varying intensity, until the maximum current flows through the coil of said electromagnet, and then heating the defective coil by the action of current set up therein by the inductive action of said magnet, substantially as described.

3. The method of detecting a closed circuit in one or more of a group of coils which consists in subjecting said coils to the action of a magnetic field brought into proximity thereto and indicating the reaction of the defective coil or coils upon the magnetic field.

4. The method of detecting whether or not a closed circuit is present in a given coil or coils among a number of coils, which consists in subjecting said coils to the action of a magnetic field brought into proximity thereto and determining which, if any, of the coils reacts upon the magnetic field, substantially as described.

5. The method of detecting whether or not a closed circuit is present in a given coil or coils among a number of coils, which consists in varying the number of magnetic lines of force passing through said coil and determining whether or not a current is produced thereby in said coil, substantially as described.

6. The method of detecting the presence of a closed circuit in a given coil or coils among a number of coils, which consists in placing said coil in magnetic relation to a fluctuating magnetic field brought into proximity to the coil to be tested, and determining whether or not it acts to lower the maximum intensity of said field, substantially as described.

7. The method of detecting the presence of a closed circuit in a given coil or coils among a number of coils, which consists in bringing said coil or coils into magnetizing relation to a second coil carrying a fluctuating current and determining whether or not it acts to alter the counter electromotive force of such second coil, substantially as described.

8. A testing device for detecting closed circuits in a coil or coils consisting of a source of fluctuating current, an electromagnet in circuit therewith having an unobstructed space within the magnetic field, and means for indicating changes in the counter electromotive force opposed by the coil of said electromagnet, substantially as described.

9. A testing device for detecting closed circuits in a coil or coils consisting of a constant-potential source of fluctuating current, an electromagnet in circuit therewith having an unobstructed space within the magnetic field, and means for indicating changes in the current flowing through the coils of said electromagnet, substantially as described.

10. In a testing device for detecting closed circuits, a constant-potential source of fluctuating currents, an electromagnet, a resistance in series therewith and means for comparing the proportion of potential drop in said resistance to that in the coils of said electromagnet, substantially as described.

11. In a testing device for detecting closed circuits, a constant-potential source of fluctuating currents and an electromagnet in circuit therewith; in combination with a converter having its primary in series with the coils of said electromagnet and an electric indicator in series with the secondary of said converter, substantially as described.

12. In a testing device for detecting closed circuits, a constant-potential source of fluctuating currents, and an electromagnet in circuit therewith; in combination with a converter having its primary in series with the coils of said electromagnet and an electric indicator in series with the coils of said converter, substantially as described.

13. In a testing device for detecting defective coils on an armature, bearings for said armature, a base adapted to swing freely on the shaft of said armature, a horseshoe electromagnet on said base, curved to conform to the shape of said armature, and means for indicating changes in the counter electromotive force in the coil of said electromagnet, substantially as described.

14. In a testing device for detecting defective coils on an armature, bearings for said armature, a base adapted to swing freely on the shaft of said armature, a laminated horseshoe electromagnet curved to conform to the shape of said armature, a converter also mounted on said base and having its primary in series with the coils of said electromagnet, and an electric indicator in series with the secondary of said converter, substantially as described.

In testimony whereof we have hereunto subscribed our names this 20th day of December, A. D. 1892.

CHAS. F. SCOTT.
CHARLES E. SKINNER.

Witnesses:
JAMES W. SMITH,
HAROLD S. MACKAYE.